United States Patent [19]

Ishimaru et al.

[11] 3,855,880
[45] Dec. 24, 1974

[54] HYDRAULIC PRESSURE CONTROL SYSTEM FOR AN AUTOMATIC POWER TRANSMISSION

[75] Inventors: Wataru Ishimaru; Toshiyuki Miyauchi, both of Yokohama, Japan

[73] Assignee: Nissan Motor Company, Limited, Yokohama, Japan

[22] Filed: Apr. 12, 1974

[21] Appl. No.: 460,472

Related U.S. Application Data

[63] Continuation of Ser. No. 269,301, July 6, 1972, abandoned.

[30] Foreign Application Priority Data
Nov. 26, 1971    Japan.............................. 46-95024

[52] U.S. Cl.................... 74/868, 74/866, 74/DIG. 1
[51] Int. Cl.......................................... B60k 21/00
[58] Field of Search............. 74/864, 866, 867, 868, 74/869

[56] References Cited
UNITED STATES PATENTS

| | | | |
|---|---|---|---|
| 3,685,372 | 8/1972 | Miyazaki........................... | 74/869 X |
| 3,709,066 | 1/1973 | Burcz................................. | 74/866 |

*Primary Examiner*—Benjamin W. Wyche
*Assistant Examiner*—John Reep

[57] ABSTRACT

A control system for controlling the level of hydraulic pressure to be supplied to a serve mechanism of a friction element of an automotive automatic power transmission, which control system is arranged to have a conduit means hydraulically connecting a regulator valve to a shift valve for admitting the hydraulic pressure to be exerted on a valve spool of the shift valve to the regulator valve so that the hydraulic pressure is applied on a valve spool of the regulator valve to move the same to a position to decrease the level of the hydraulic pressure before the coupling of the friction element whereby a smooth coupling of the friction element is obtained.

2 Claims, 7 Drawing Figures

HYDRAULIC PRESSURE CONTROL SYSTEM FOR AN AUTOMATIC POWER TRANSMISSION

This is a continuation, of application Ser. No. 269,301, filed July 6, 1972, now abandoned.

This invention relates in general to hydraulic control systems for use in automotive automatic power transmissions and more particularly to a control system for controlling a hydraulic pressure in a hydraulic control system for an automotive automatic power transmission.

An automatic power transmission use in a motor vehicle commonly includes a hydraulic control system for controlling the friction elements, such as friction clutches and brakes, to selectively provide a plurality of gear ratios. To effect smooth shifting between the gear ratios, it is desirable to change the torque capacity of the friction elements in accordance with the variations on engine load and vehicle speed. The required torque capacity increases as the engine load increases so that it must be relatively great at starting or during low speed driving and relatively small during high speed driving.

If the torque capacity of such friction element is too small as compared to the required torque capacity at a given time, the slippage between the members to be coupled to each other will be to high, resulting in an inaccurate operation or runaway of the engine will take place. If, in contrast, the torque capacity of the friction element is too large, the clutch or brake will engage instantaneously and thus an objectionable shock will take place. Since the torque capacity of the friction element depends on the level of hydraulic pressure used in the hydraulic control system, smooth engagement of the friction elements can be accomplished by controlling the hydraulic pressure so as to minimize the difference between the torque capacity of the friction element and the required torque to be transmitted.

In the prior art hydraulic control systems, the level of the hydraulic pressure is increased when the vehicle speed is below a predetermined value and decreased by effecting the cutback in the hydraulic pressure when the vehicle speed is above the predetermined value. The cutback of the hydraulic pressure is conventionally effected by a certain suitable means, such as hydraulic cutback valve. The use of the cutback valve is, however, reflected by a complicated construction of the hydraulic control system as a whole. To overcome this shortcoming, it has heretofore been proposed to utilize a shift valve for effecting shifting between the gear ratios with a view to decrease the level of the line pressure during shifting of the particular gear ratio. This shift valve, however, is not fully acceptable because of its limited responsiveness and inability of effecting smooth shifting between the gear ratios particularly where the power transmission is controlled automatically.

It is, therefore, an object of the present invention to provide an improved control system for controlling hydraulic pressure in a hydraulic control system of an automotive automatic power transmission.

Another object of the present invention is to provide an improved control system for controlling hydraulic pressure in a hydraulic control system of an automotive automatic power transmission to a value appropriate for effecting smooth shifting between a plurality of gear ratios.

A further object of the present invention is to provide an improved hydraulic pressure control system for a hydraulic control system of an automotive automatic power transmission, which hydraulic pressure control system is simple in construction and economical to manufacture.

These and other features and advantages of the present invention will be become more apparent from the following description when taken in conjunction with the accompanying drawings, in which.

Figure 1:
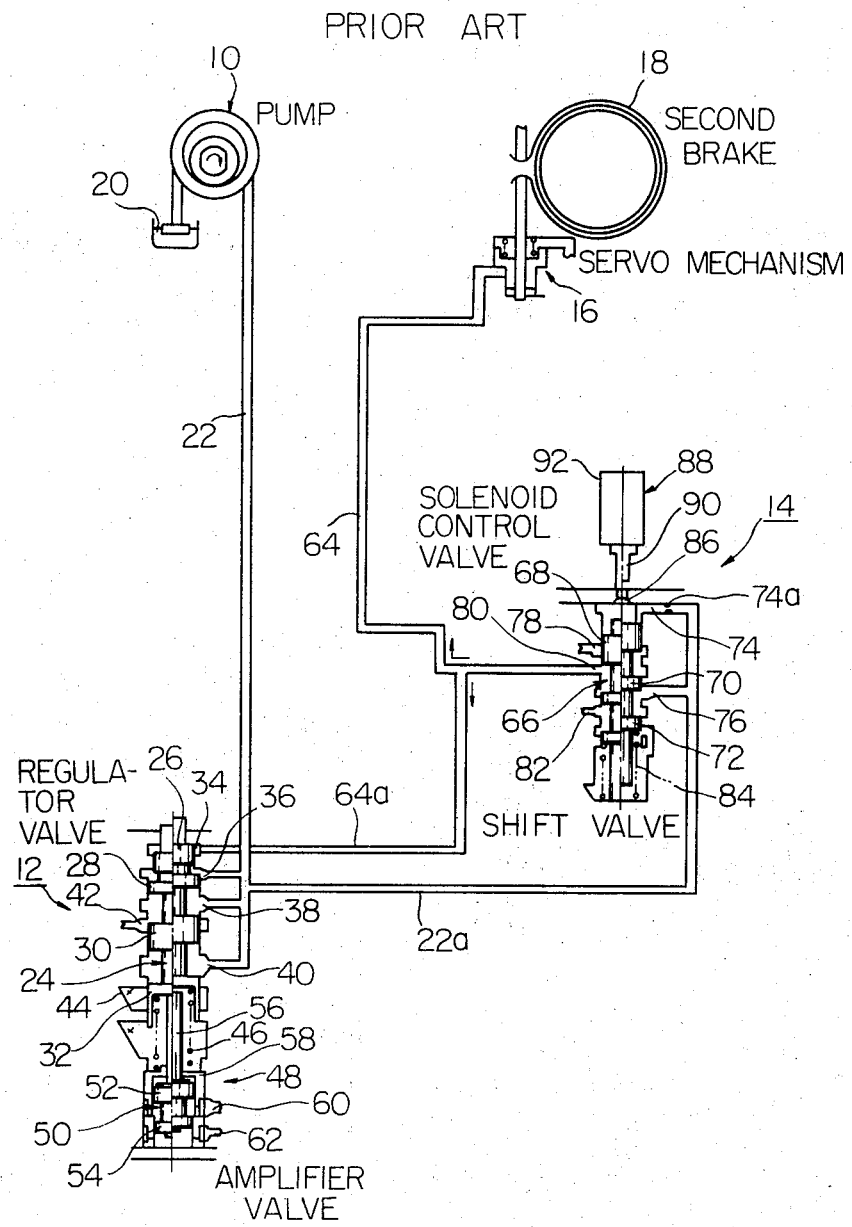
FIG. 1 is a schematic view illustrating an example of a prior art hydraulic pressure control system for an automotive automatic power transmission.

Reference is first made to FIG. 1 to clearly bring out the previously discussed drawbacks of the prior art hydraulic pressure control system for the hydraulic control system of the automotive automatic power transmission. It should be appreciated that a minimum number of component parts are shown in FIG. 1 for the take of simplicity of illustration.

As illustrated in FIG. 1, the hydraulic pressure control system of prior art is shown to include a source 10 of pressurized fluid, a hydraulic pressure regulator valve 12, and a shift valve 14 which controls a servo mechanism 16 of a friction brake 18 to effect shifting between a plurality of gear ratios. The friction brake 18 is herein shown as a second brake to provide a second speed gear ratio for example only.

The source 10 of pressurized fluid such as a positive displacement pump or an oil pump, which may be of any suitable construction, supplies pressurized fluid from a sump 20, which pressurized fluid is delivered to a hydraulic pressure conduit 22. The hydraulic pressure conduit 22 is hydraulically connected to the line pressure regulator valve 12 which is adapted to regulate the pressurized fluid delivered through the hydraulic pressure conduit 22 and transmit the regulated hydraulic pressure to a branch conduit 22a, which regulated hydraulic pressure is utilized for actuating the servo mechanism 16 of the friction brake 18 as will be discussed in detail. This hydraulic pressure is herein referred to as a line pressure.

The hydraulic pressure regulator valve 12, which may be of any known construction and may include a slidable valve spool 24 having a plurality of spaced valve lands 26, 28, 30 and 32. The line pressure regulator valve 12 has a plurality of ports 34, 36, 38, 40, 42 and 44. The port 34 may be hydraulically connected to the shift valve 14. The ports 36 and 38 may be hydraulically connected to the line pressure conduit 22, to which the port 40 is also hydraulically connected. The port 42 is hydraulically connected to a hydrodynamic torque converter (not shown) of the automatic power transmission. The port 44 is a drain through which the excess of pressurized fluid is drained off to regulate the hydraulic pressure delivered to the branch conduit 22a. The degree of fluid communication between the port 40 and the drain 44 is controlled by the valve land 32 of the slidable valve spool 24 and thus the hydraulic pressure is regulated. A compression spring 46 is provided for biasing the slidable valve spool 24 to a position to decrease the degree of fluid communication between the port 40 and the drain 44 for thereby increasing the level of the hydraulic pressure to be transmitted to the branch conduit 22a. As shown, the line pressure regulator valve 12 is operatively associated with an amplifier valve 48.

The amplifier valve 48 includes a slidable valve spool 50 having spaced valve lands 52 and 54. On the valve spool 50 is mounted a push rod 56 which cooperates with the valve land 32 of the slidable valve spool 24 of the line pressure regulator valve 12 for biasing the valve spool 24 to a position to close the fluid communication between the port 40 and the drain 44. The valve spool 50 is slidably disposed in a sleeve 58 which is provided with ports 60 and 62, which are hydraulically connected to associated parts (not shown) of the hydraulic control system of the automatic power transmission.

The shift valve 14 is provided for controlling the fluid communication between the branch conduit 22a leading from the line pressure conduit and a conduit 64 leading to the servo mechanism 16 of the friction brake 18. This shift valve 14 includes a slidable valve spool 66 having spaced valve lands 68, 70 and 72. The shift valve 14 has a plurality of ports 74, 76, 78, 80 and 82. The port 74, which has formed therein a flow restriction 74a, is hydraulically connected to the branch conduit 22a, to which the port 76 is also hydraulically connected. The ports 78 and 82 are hydraulically connected to associated parts (not shown) of the hydraulic control system of the automatic power transmission. The port 80 is hydraulically connected to the conduit 64 leading to the servo mechanism 16 of the friction brake 18. The port 80 is also hydraulically connected to the port 34 of the hydraulical pressure regulator valve 12 through a branch conduit 64a. A compression spring 84 is provided for biasing the slidable valve spool 66 to a position in which the fluid communication between the ports 76 and 78 is interrupted. The shift valve 14 also has a port 86, which is opened and closed to control the movements of the slidable valve spool 66. To open and close the port 86, an actuating means is provided, which is shown as a solenoid control valve 88 having a plunger 90. The plunger 90 being adapted to selectively protrude to close the port 86 to cause the hydraulic pressure in the port 74 to be exerted on the valve land 68 of the valve spool 66 to move the same to a position to provide a fluid communication between the ports 76 and 80. The solenoid control valve 88 has a solenoid 92 which is electrically connected to a electronic control circuit (not shown) associated with the hydraulic control system of the automatic power transmission and selectively energized and de-energized in response to an electric signal delivered therefrom.

When, in operation, the solenoid is energized, the plunger 90 of the solenoid control valve 88 is retracted so that the port 86 is opened. In this instance, the hydraulic pressure in the port 74 is discharged off from the port 86 and, accordingly, there is no hydraulic pressure acting on the valve land 68 of the valve spool 66. Under this circumstance, the valve spool 66 is moved upwardly of the drawing by the action of the compression spring 84 to a position to cause the valve land 70 to interrupt the fluid communication between the ports 76 and 80. Consequently, the hydraulic pressure is prevented from being delivered to the conduit 64 with a result that the friction brake 18 is uncoupled. At the same time, the hydraulic pressure is also prevented from being delivered to the port 34 through the branch conduit 64a so that the valve spool 24 is moved upwardly of the drawing by the action of the spiral spring 46 to cause the valve land 32 to decrease the degree of fluid communication between the port 40 and the drain 44 for thereby increasing the level of the hydraulic pressure.

When, however, the solenoid 92 of the solenoid control valve 88 is de-energized, the plunger 90 is caused to protrude thereby closing the port 86. In this condition, the line pressure in the port 74 acts on the valve land 68 of the valve spool 66 thereby moving the valve spool downwardly of the drawing against the force of the compression spring 84 so that fluid communication between the ports 76 and 80 is established. At this instant, the line pressure is supplied through the conduit 64 to the servo mechanism 16 which consequently causes the friction brake 18 to be coupled to provide a particular gear ratio. At the same time, the hydraulic pressure in the port 80 is also passed through the branch conduit 64a to the port 34 of the hydraulic pressure regulator valve 12. The line pressure thus delivered to the port 34 acts on the valve land 26 of the valve spool 24, thereby moving the valve spool 24 downwardly of the drawing against the force of the compression spring 46 for increasing the degree of fluid communication between the port 40 and the drain 44 to decrease the level of the hydraulic pressure to be transmitted to the branch conduit 22a. The line pressure thus decreased in the level thereof is supplied through the branch conduit 22a to the shift valve 14, through which the decreased hydraulic pressure is passed to the servo mechanism 16 of the friction brake 18.

Figure 2:
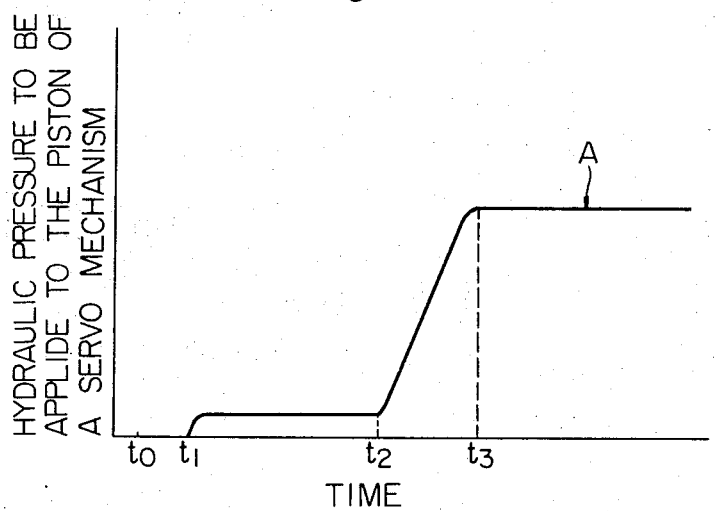
FIG. 2 is a graph illustrating an example of the variations in the hydraulic pressure acting on a piston of a servo mechanism actuating in terms of time which is attained by the use of the hydraulic pressure control system shown in FIG. 1.
Figure 3:
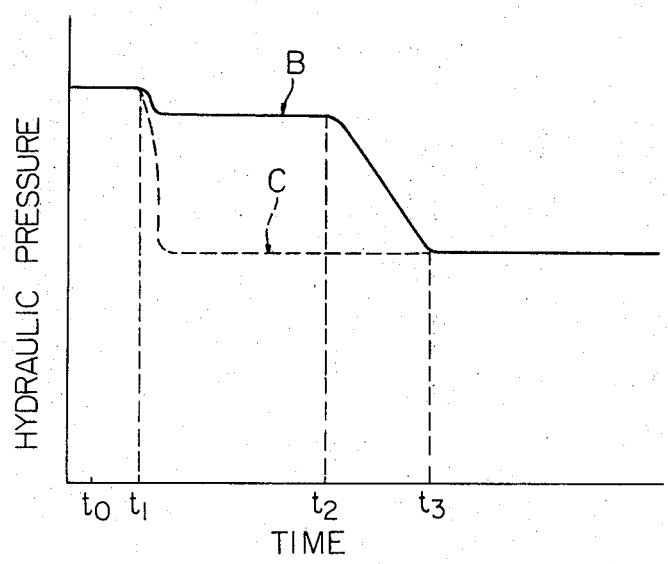
FIG. 3 is a view similar to FIG. 2 but showing an example of the variations in the hydraulic pressure controlled by the hydraulic pressure control system of FIG. 1.

As previously noted, a problem is encountered in the prior art hydraulic pressure control system in that, since the branch conduit 64a leading to the port 34 of the line pressure regulator valve 12 is directly hydraulically connected to the conduit 64 leading to the servo mechanism 16, the friction brake 18 is coupled before the line pressure is decreased to cause the torque capacity of the friction brake to become too large resulting in an objectionable shifting shock. This is more clearly explained by the following description with reference to FIGS. 2 and 3. FIG. 2 represents the variations in the line pressure delivered to the servo mechanism 16 of the friction brake 18 in terms of time, while FIG. 3 illustrates the variations in the line pressure delivered to the servo mechanism 16 of the friction brake 18 in terms of time, while FIG. 3 illustrates the variations in the line pressure regulated by the line pressure regulator valve 12 in terms of time. If it is assumed that the solenoid 92 of the solenoid control valve 88 is deenergized at the time of $t_0$, the shift valve 14 is shifted at the time of $t_1$ slightly later than the time $t_0$ thereby causing the port 76 to communicate with the port 80 for thereby transmitting the hydraulic pressure to the conduit 64. Consequently, the line pressure in the inlet (not identified) of the servo mechanism 16 is initially flown into the cylinder (not identified) of the servo mechanism 16 and acts on the piston (not identified) to move the same from time $t_1$ to time $t_2$ as seen in FIG. 2. During the time period between the time $t_2$ and $t_3$, the hydraulic pressure is subsequently supplied into the cylinder of the servo mechanism 16 to move the piston thereof to completely couple the friction brake 18. Thus, the hydraulic pressure acting on the piston of the servo mechanism 16 varies in accordance with the curve A in FIG. 2. On the other hand, the hydraulic pressure regulated by the hydraulic pressure regulator value reached a relatively high value at the time $t_1$ and decreases as shown by the curve B in FIG. 3. It will be appreciated from the curve B in FIG. 3 that a relatively higher hydraulic pressure is supplied to the servo mechanism 16 at the initial stage of the coupling of the friction brake 18 thus causing an objectionable shock. This is due to the fact that the branch conduit 64a is directly connected to the conduit 64 and that the relatively high hydraulic pressure is delivered to the servo mechanism 16 before the same is decreased by the action of the hydraulic pressure regulator valve 12. In order to alleviate the shifting shock caused by the actuation of the friction brake 18, it is desired that the hydraulic pressure acting on the piston of the servo mechanism 16 be varied in accordance with a curve C shown in FIG. 3.

The present invention contemplates to provide an improved hydraulic pressure control system which is arranged to effect cutback in the hydraulic pressure to decrease the level thereof before the actuation of the servo mechanism of the friction element by a simple means incorporated in a usual hydraulic circuit without the use of additional complicated shift valves or, actuating means and/or complicated an electronic control circuit.

Figure 4:
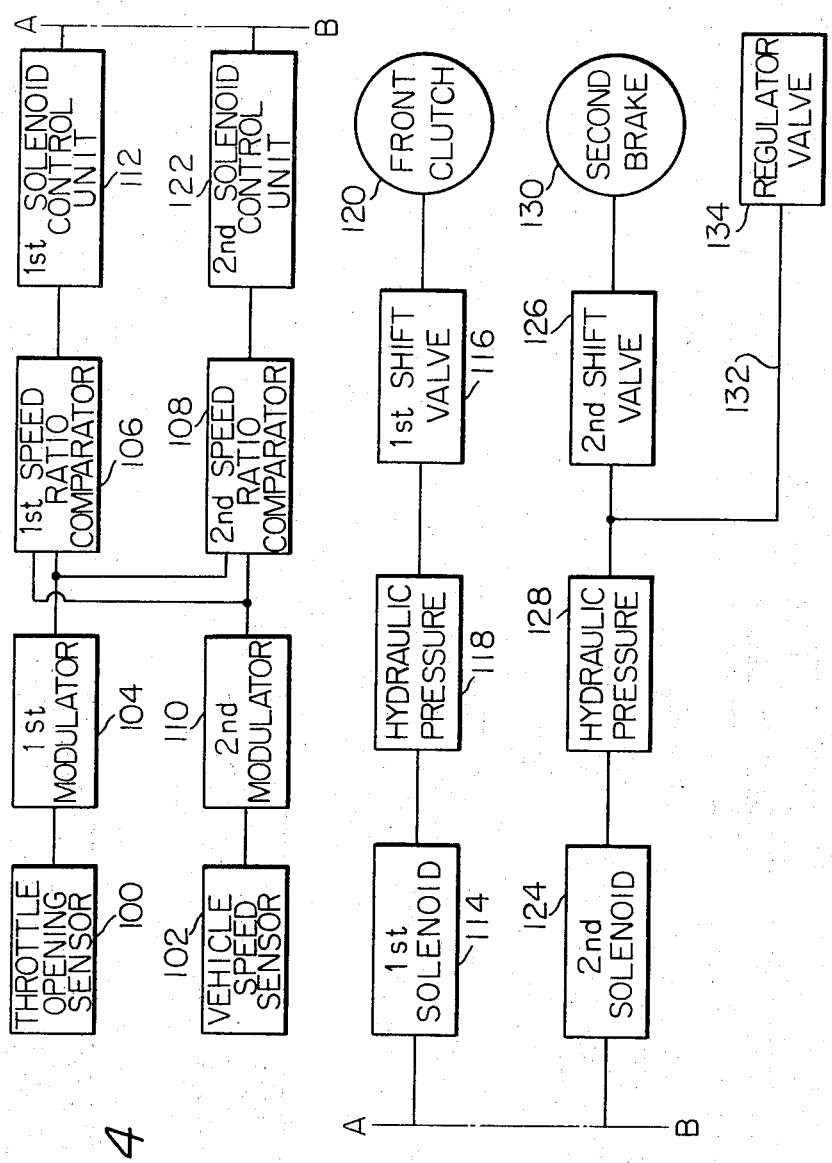
FIG. 4 is a block diagram which schematically illustrates the basic construction principles governing various preferred embodiments of the present invention.

A preferred embodiment of the hydraulic pressure control system for materializing the above concept is shown in block form in FIG. 4. As shown, the hydraulic pressure control system includes a throttle opening sensor 100 and a vehicle speed sensor 102. The throttle opening sensor 100, which may be of any known construction, senses the open condition of the carburetor throttle valve of an internal combustion engine thereby to generate an electric signal corresponding to an output torque of the engine. The vehicle speed sensor 102, which may be of any conventional construction, senses the rotational speed of an output shaft of the automatic power transmission to generate an electric signal corresponding thereto. The electric signal generated by the throttle opening sensor 100 is delivered through a first modulator 104 to first and second speed ratio comparator units 106 and 108, respectively. Similarly, the electric signal generated by the vehicle speed sensor 102 is transmitted through a second modulator 110 to the first and second governor units 106 and 108, respectively. The first governor unit 106, which may be of known construction, functions to generate a third speed ratio shifting signal in response to the electric sig-
nals delivered from the throttle opening sensor 100 and the vehicle speed sensor 102. Likewise, the second governor unit 108, which may be of suitable construction, functions to generate a second speed ratio shifting signal in response to the electric signals delivered from the throttle opening sensor 100 and the vehicle speed sensor 102. The third speed ratio shifting signal generated by the first governor unit 106 is supplied to a first solenoid control unit 112 which is electrically connected to a first solenoid 114. Upon receiving the third speed ratio shifting signal, the first solenoid control unit 112 controls the first solenoid 114 to actuate a first shift valve 116 so that a hydraulic pressure represented at 118 is applied to a front clutch 120 for thereby providing a third speed gear ratio. The second speed ratio shifting signal generated by the second governor unit 108 is supplied to a second solenoid control unit 122 which is electrically connected to a second solenoid 124 (which corresponds to the solenoid 92 shown in FIG. 1). Upon receiving the second speed ratio shifting signal, the second solenoid control unit 122 controls the second solenoid 124 to actuate a second shift valve 126 (which corresponds to the shift valve 14 shown in FIG. 1) so that a hydraulic pressure represented by 128 (which corresponds to the hydraulic pressure prevailing in the port 74 at the shift valve 14 shown in FIG. 1) is supplied to a second brake 130 (which corresponds to the friction brake 18 shown in FIG. 1) for thereby providing a second speed gear ratio. According to an important feature of the present invention, the hydraulic pressure for actuating the shift valve 126 is directly passed through a conduit 132 to a hydraulic pressure regulator valve 134 (which corresponds to the hydraulic pressure regulator valve 12 shown in FIG. 1).

Figure 5:
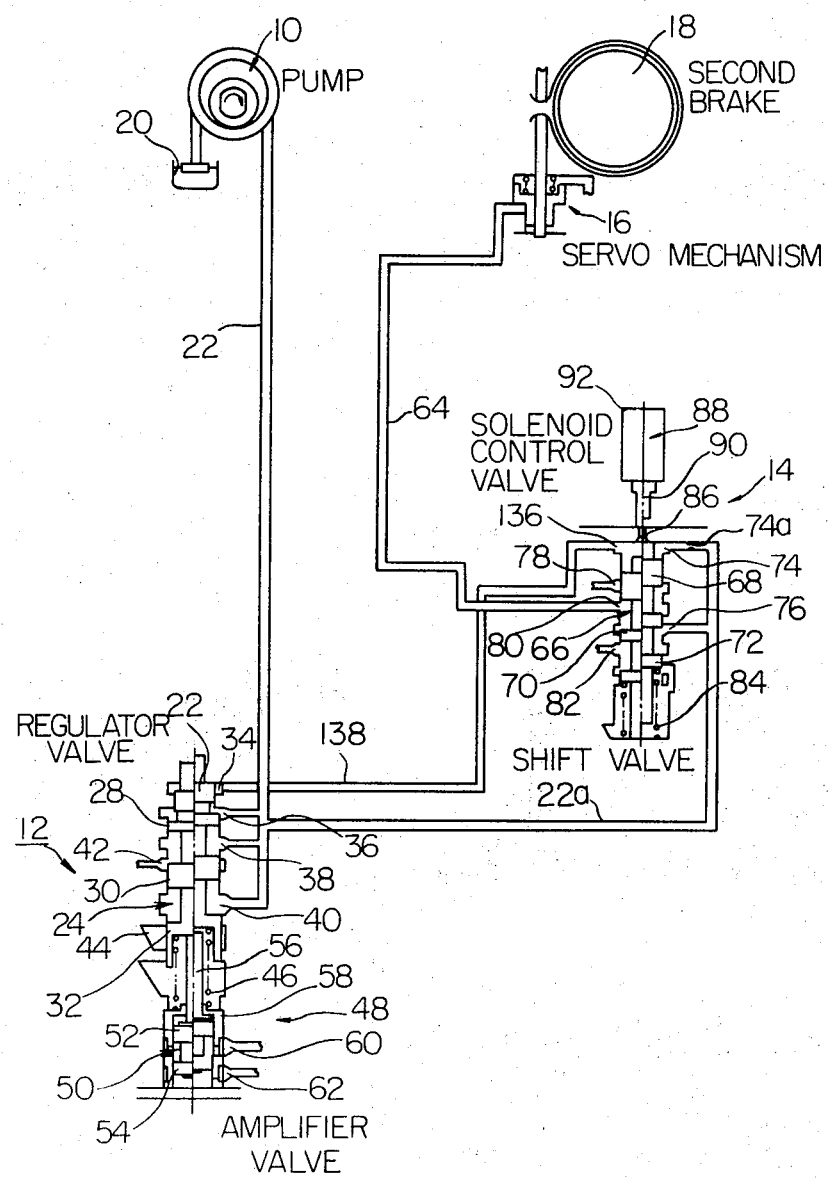
FIG. 5 is a schematic view of a preferred embodiment of the hydraulic pressure control system implementing the present invention.

A detail construction of the hydraulic pressure control system embodying the present invention is shown in FIG. 5, wherein like or corresponding component parts are designated by same reference numerals as those used in FIG. 1. This embodiment differs from the prior art hydraulic pressure control system in that an improved circuit arrangement is incorporated in the hydraulic pressure control system and, therefore, the detail discussion of the improved circuit arrangement will be only herein made for the sake of simplicity of illustration. As shown, the shift valve 14 forming part of the hydraulic presure control system is provided with an additional port 136 which communicates with the port 74. The additional port 136 is hydraulically connected to a conduit 138, which in turn is hydraulically connected to the port 34 of the hydraulic pressure regulator valve 12.

With this arrangement, when the solenoid 92 of the solenoid control valve 88 cooperating with the shift valve 14 is deenergized, the plunger 90 is caused to protrude to close the port 86. In this instance, the level of the hydraulic pressure in the port 74 increase thereby acting on the valve land 68 of the valve spool 66 to move the same to a position to establish fluid communication between the ports 76 and 80 as previously described. At the same time, the increased hydraulic pressure is delivered to the port 136, from which hydraulic pressure is passed through the conduit 138 to the port 34 of hydraulic pressure regulator valve 12. The hydraulic pressure transmitted to the port 34 acts on the valve land 28 of the valve spool 24 thereby moving the valve spool 24 downwardly of the drawing to increase the degree of fluid, communication between the port 40 and the drain 44 so that the level of the hydraulic pressure is decreased. Thus, since hydraulic pressure is supplied to the port 34 of the hydraulic pressure regulator valve 12 simultaneously actuated with the shift valve 14, the level of the hydraulic pressure is decreased to a proper value before the friction brake 18 is engaged for thereby effecting smooth engagement of the friction brake 18.

Figure 6:
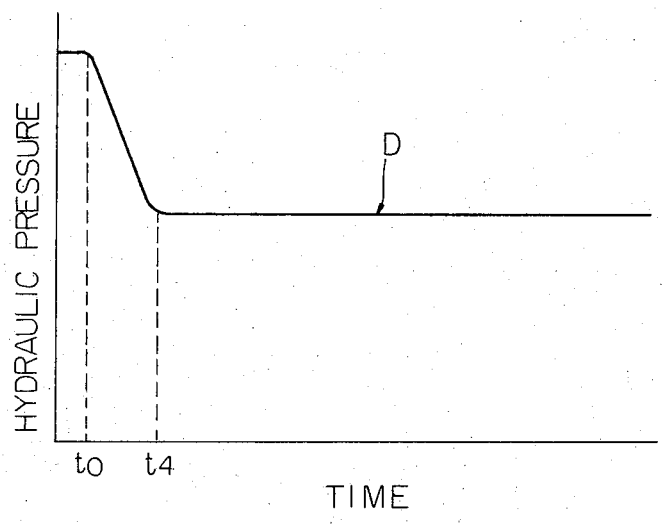
FIG. 6 is a graph illustrating an example of the variations in the hydraulic pressure in terms of time which is attained with the use of the hydraulic pressure control system of FIG. 5.

FIG. 6 illustrates an example of the variations in the line pressure in terms of time which is attained with the use of the hydraulic pressure control system according to the present invention. A curve D in FIG. 5 represents such variations of the hydraulic pressure. As seen from FIG. 5, the hydraulic pressure control system of the present invention commences to decrease the hydraulic pressure at the time $t_0$ where the solenoid of the solenoid control valve associated with the shift valve is to be deenergized and completes its function to decrease the hydraulic pressure at the time $t_4$ which is slightly later than time $t_1$ where the piston of the servo mechanism for actuating the friction brake starts to move. It will thus be seen that the hydraulic pressure is maintained at an appropriate value when the friction brake is coupled for thereby effecting smooth coupling of the friction brake to eliminate shifting shock.

Figure 7:
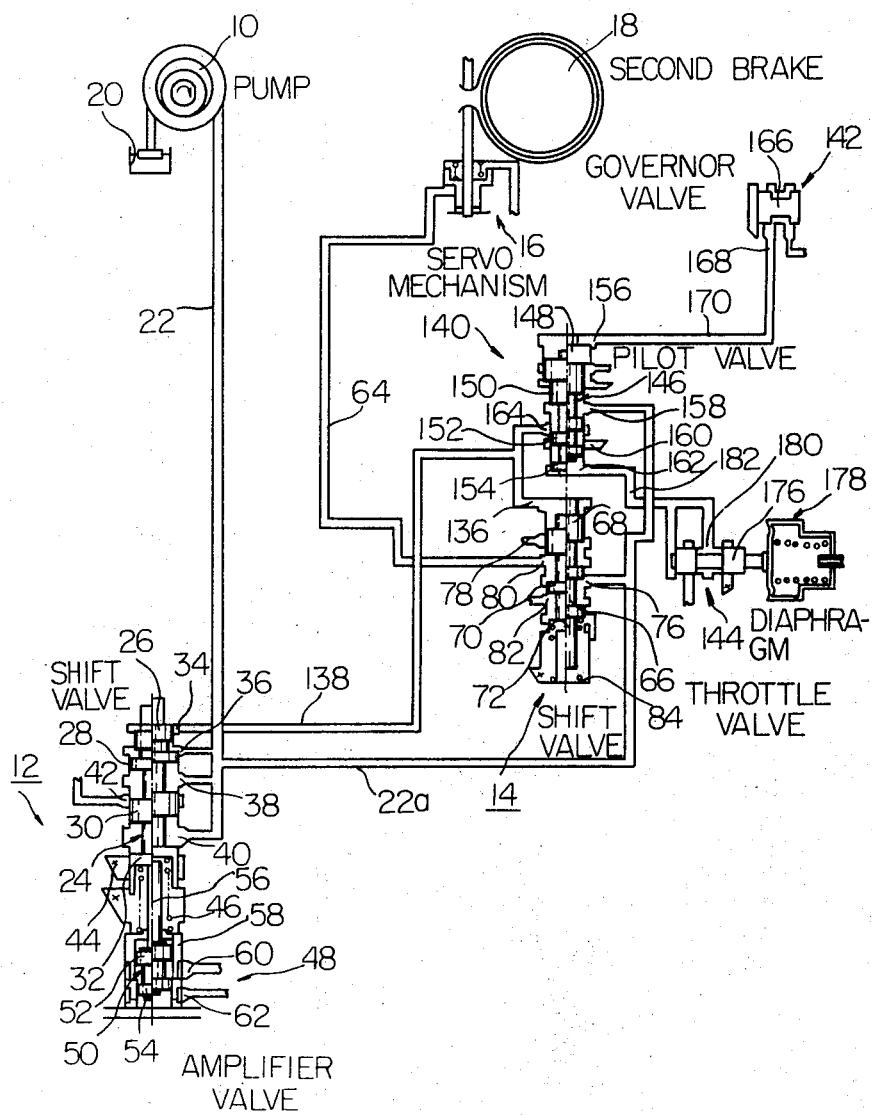
FIG. 7 is a schematic view of another preferred embodiment of the line pressure control system according to the present invention.

Another preferred embodiment of the present invention is illustrated in FIG. 7 wherein like or corresponding component parts are designated by the same reference numerals as those used in FIG. 5. In this illustrated embodiment, the solenoid valve is replaced by a pilot valve 140 which is actuated by a fluid pressure governor valve 142 and a throttle valve 144 instead of the vehicle speed sensor 102 and the throttle opening sensor 100 shown in FIG. 4. The pilot valve 140 includes a slidable valve spool 146 having spaced valve lands 148, 150, 152 and 154. The pilot valve 140 has a plurality of ports 156, 158, 160, 162 and 164. The port 156 is hydraulically connected to the fluid pressure governor valve 142. The port 158 is hydraulically connected to the branch conduit 22a. The port 160 is drain through which excess of pressurized fluid is discharged. The port 162 is hydraulically connected to the throttle valve 144. The port 164 is hydraulically connected to the conduit 138, to which the port 136 of the shift valve 14 is also hydraulically connected.

The fluid pressure governor valve 142 includes a slidable valve spool 166 which is responsive to the rotational speed of the output shaft of the automatic power transmission and produces a pressure signal dependent on the vehicle speed. The fluid pressure governor valve 142 has a port 168 to which the pressure signal generated by the valve spool 166 is delivered. The pressure signal in the port 168 is supplied through a conduit 170 to the port 156 of the pilot valve 140 and is applied on the valve land 148 to move the valve spool 146 downwardly of the drawing.

The throttle valve 144 includes a slidable valve spool 176 which is connected to and actuated by a diaphragm device 178 which is adapted to respond to an intake manifold vacuum of the engine and functions to produce a pressure signal in dependence on the output torque of the engine. This pressure signal is produced in a port 180, from which the pressure signal is delivered through a conduit 182 to the port 162 of the pilot valve 140 for biasing the valve spool 146 upwardly of the drawing.

When, now, the vehicle speed is low, the pressure signal, namely, a governor pressure generated by the fluid pressure governor valve 142 is low so that the valve spool 146 of the pilot valve 140 is moved upwardly of the drawing by the pressure, namely, the throttle pressure acting on the valve land 154 thereby interrupting fluid communication between the ports 158 and 164. In this instance, hydraulic pressure is not supplied to the port 34 of the hydraulic pressure regulator valve 12 and, accordingly, the valve spool 24 is moved upwardly of the drawing by the force of the spring 46 thereby decreasing the degree of fluid communication between the port 40 and the drain 44. Thus, the line pressure delivered to the branch conduit 22a is held at a relatively higher value.

When, however, the vehicle speed increases to a certain value, the governor pressure applied to the port 156 of the pilot valve increases so that the force acting on the valve land 148 of the valve spool 146 overcomes the force acting on the valve land 154 of the valve spool 146. Consequently, the valve spool 146 is moved downwardly of the drawing thereby causing the port 158 to communicate with the port 164 thereby admitting hydraulic pressure to the port 14 of the hydraulic pressure regulator valve 12 with a result that the hydraulic pressure is decreased in a manner as previously described. At the same time, the hydraulic pressure admitted to the port 164 of the pilot valve 140 is delivered to the port 136 of the shift valve 14. The hydraulic pressure in the port 136 acts on the valve land 68 to move the valve spool 66 downwardly against the force of the compression spring 84 thereby establishing fluid communication between the ports 76 and 80. In this instance, hydraulic pressure in the port 76 is admitted to the port 80 from which hydraulic pressure is passed through the conduit 64 to the servo mechanism 16 so that the friction brake 18 is engaged. It will be appreciated that hydraulic pressure is decreased to a proper value before the friction brake 18 is engaged whereby the shifting shock is satisfactorily prevented.

It will now be understood from the foregoing description that, according to an important feature of the present invention, a cutback in the line pressure is effected before engaging the friction element by applying hydraulic pressure acting on the valve spool of the shift valve to the hydraulic pressure regulator valve for controlling the movement of the valve spool thereof whereby the hydraulic pressure is reduced and the friction element is engaged smoothly to prevent shifting shock.

It will also be noted that the hydraulic pressure control system according to the present invention has been described hereinabove as utilized for actuating the second brake by way of example only but may be utilized for actuating other friction brakes or clutches of an automatic power transmission. Moreover, though the hydraulic pressure control system of the present invention has been described as applied to an automatic power transmission providing from second to third gear ratio, it is to be noted that the hydraulic pressure control system transmission providing more than three different gear ratios.

While two preferred embodiments of the present invention have been herein shown and described in association with the accompanying drawings, it is intended to merely exemplify the hydraulic pressure control system according to the present invention and it should be understood that the hydraulic pressure control system of the present invention may be modified in many respects without departing from the scope of the present invention which is defined in the appended claims.

What is claimed is:

1. A control system for controlling the level of hydraulic pressure supplied to a servo mechanism of a friction element of an automotive automatic power transmission driven by an engine comprising, in combination, a source of hydraulic pressure, a first conduit means hydraulically connected to said source of hydraulic pressure, a regulator valve communicating with said source of hydraulic pressure through said first conduit means and having a valve spool for controlling the level of the hydraulic pressure, a branch conduit hydraulically connected to said first conduit means and communicating with said regulator valve therethrough, a shift valve hydraulically connected to said branch conduit and having a valve spool for controlling the supply of hydraulic pressure to be supplied to said servo mechanism, the movements of the valve spool of said shift valve being controlled by the hydraulic pressure exerted on the valve spool of said shift valve, and a second conduit means hydraulically connected between said shift valve and said regulator valve, said second conduit means passing the hydraulic pressure to be exerted on the valve spool of said shift valve to said regulator valve which hydraulic pressure acts on the valve spool of said regulator valve, whereby the valve spool of said regulator valve is moved in a direction to reduce the level of the hydraulic pressure to be supplied to said servo mechanism simultaneously with the actuation of the valve spool of said shift valve for thereby effecting smooth engagement of said friction element, further comprising an actuating means associated with said shift valve for controlling the hydraulic pressure to be exerted on the valve spool of said shift valve for thereby controlling the movements of the valve spool of said shift valve, wherein said shift valve has a port which is hydraulically connected to said second conduit means, wherein said actuating means includes a pilot valve hydraulically connected between said branch conduit and said second conduit means and having a valve spool to control the hydraulic pressure to be admitted to the port of said shift valve, further comprising first sensing means to sense vehicle speed and a second sensing means to sense on output torque of said engine, and wherein said first sensing means includes a hydraulic governor valve adapted to produce a first pressure signal in dependence on the vehicle speed, said hydraulic governor valve communicating with said pilot valve for applying said first pressure signal on one end of the valve spool of said pilot valve, and wherein said second sensing means includes a throttle valve adapted to produce a second pressure signal in dependence on the output torque of said engine, said throttle valve communicating with said pilot valve for applying said second pressure signal on the other end of the valve spool of said pilot valve.

2. A control system for controlling the level of hydraulic pressure supplied to a servo mechanism of a friction element of an automotive automatic power transmission driven by an engine comprising, in combination, a source of hydraulic pressure, a first conduit means hydraulically connected to said source of hydraulic pressure, a regulator valve communicating with said source of hydraulic pressure through said first conduit means and having a valve spool for controlling the level of the hydraulic pressure, a branch conduit hydraulically connected to said first conduit means and communicating with said regulator valve therethrough, a shift valve hydraulically connected to said branch conduit at first and second ports of said shift valve and having a valve spool for controlling the supply of hydraulic pressure to be supplied to said servo mechanism through a third port, the movements of the valve spool of said shift valve being controlled by the hydraulic pressure exerted through said first port on the valve spool of said shift valve, and a second conduit means hydraulically connected between another port in said shift valve, which is in communication with said first port, of said shift valve, and said regulator valve, said second conduit means passing the hydraulic pressure to be exerted on the valve spool of said shift valve directly to said regulator valve which hydraulic pressure acts on the valve spool of said regulator valve, whereby the valve spool of said regulator valve is moved in a direction to reduce the level of the hydraulic pressure to be supplied to said servo mechanism before the valve spool of said shift valve is actuated to a position providing communication between said second and third ports of said shift valve for thereby effecting smooth engagement of said friction element, further comprising an actuating means associated with said shift valve for controlling the hydraulic pressure to be exerted on the valve spool of said shift valve for thereby controlling the movements of the valve spool of said shift valve, wherein said actuating means includes a solenoid control valve having a plunger adapted to control the hydraulic pressure to be admitted to said first port.

* * * * *